US008985134B2

(12) United States Patent
Grossmann

(10) Patent No.: US 8,985,134 B2
(45) Date of Patent: Mar. 24, 2015

(54) DEVICE AND METHOD FOR ASEPTIC PRESSURE RELIEF

(75) Inventor: Holger Grossmann, Hamburg (DE)

(73) Assignee: KHS GmbH, Dortmund (DE)

(*) Notice: Subject to any disclaimer, the term of this patent is extended or adjusted under 35 U.S.C. 154(b) by 547 days.

(21) Appl. No.: 12/933,558

(22) PCT Filed: Mar. 21, 2009

(86) PCT No.: PCT/EP2009/002099
§ 371 (c)(1),
(2), (4) Date: Sep. 20, 2010

(87) PCT Pub. No.: WO2009/124648
PCT Pub. Date: Oct. 15, 2009

(65) Prior Publication Data

US 2011/0017313 A1 Jan. 27, 2011

(30) Foreign Application Priority Data

Apr. 11, 2008 (DE) ......................... 10 2008 018 665

(51) Int. Cl.
*F16K 15/00* (2006.01)
*B08B 9/00* (2006.01)

(52) U.S. Cl.
CPC ........................................ *B08B 9/00* (2013.01)
USPC ............ 137/240; 137/512; 137/861; 137/241

(58) Field of Classification Search
USPC ............... 137/512, 506, 505.11, 505.13, 883, 137/177, 861, 240, 238, 241
See application file for complete search history.

(56) References Cited

U.S. PATENT DOCUMENTS 4,306,012 A * 12/1942 Campbell ..................... 137/512
3,993,361 A * 11/1976 Stelzer ............................ 303/64
4,232,704 A * 11/1980 Becker et al. ................. 137/218
4,340,084 A * 7/1982 Snow ............................ 137/512
4,527,585 A * 7/1985 Mirabile ........................ 137/240
4,776,367 A * 10/1988 Hilmersson et al. .......... 137/501
4,840,057 A * 6/1989 Bingham ....................... 73/1.72
4,874,021 A * 10/1989 Ringdahl et al. ................ 141/85

(Continued)

FOREIGN PATENT DOCUMENTS

DE 37 42722 7/1989
DE 44 19 505 12/1995

(Continued)

OTHER PUBLICATIONS

International Preliminary Report on Patentability received in International Application No. PCT/EP2009/002099 dated Nov. 18, 2010.

*Primary Examiner* — Craig Schneider
*Assistant Examiner* — David Colon Morales
(74) *Attorney, Agent, or Firm* — Occhiuti & Rohlicek LLP

(57) ABSTRACT

A pressure relief device for pipeline networks includes first and second safety valves, each having an inlet side and an outlet side. The first safety valve is connected to a line of the pipeline network by its outlet side. A connecting pipeline extends between the two safety valves and connects the inlet side of the second valve to the outlet side of the first. A supply line carries a working fluid to the connecting pipeline, a supply-line safety valve for the supply line, and a discharge line connected to the connecting pipeline for removing working fluid carried to the connecting pipeline by the supply line.

14 Claims, 2 Drawing Sheets

(56) References Cited

U.S. PATENT DOCUMENTS

| | | | | |
|---|---|---|---|---|
| 5,031,661 | A * | 7/1991 | Feuz | 137/614.2 |
| 5,077,008 | A * | 12/1991 | Kralovic et al. | 422/37 |
| 5,217,698 | A * | 6/1993 | Siegel et al. | 422/295 |
| 5,391,361 | A * | 2/1995 | Thakur et al. | 422/295 |
| 5,749,389 | A * | 5/1998 | Ritrosi et al. | 137/15.04 |
| 5,771,917 | A * | 6/1998 | Carney et al. | 137/238 |
| 5,944,043 | A * | 8/1999 | Glick et al. | 137/1 |
| 5,950,653 | A * | 9/1999 | Folsom | 137/14 |
| 6,142,169 | A * | 11/2000 | Lees et al. | 137/240 |
| 6,325,090 | B1 * | 12/2001 | Horne et al. | 137/218 |
| 6,446,659 | B2 * | 9/2002 | Schroeder | 137/240 |
| 6,513,543 | B1 * | 2/2003 | Noll et al. | 137/315.11 |
| 6,990,991 | B2 * | 1/2006 | Meckes et al. | 137/1 |
| 7,059,340 | B2 * | 6/2006 | Hecking | 137/115.16 |
| 7,434,593 | B2 * | 10/2008 | Noll et al. | 137/15.18 |
| 2004/0238014 | A1 | 12/2004 | Halstead | |
| 2006/0174944 | A1 * | 8/2006 | Olander et al. | 137/240 |
| 2007/0204917 | A1 * | 9/2007 | Clayton et al. | 137/512 |

FOREIGN PATENT DOCUMENTS

| | | |
|---|---|---|
| DE | 19607840 | 3/1996 |
| DE | 19910728 | 3/1999 |
| DE | 199 22 084 | 11/2000 |
| DE | 203 17 882 | 2/2004 |
| EP | 0 051 082 | 11/1980 |
| EP | 0 360 204 | 3/1990 |
| EP | 1 230 990 | 8/2002 |
| EP | 0 022 941 | 6/2008 |

* cited by examiner

DEVICE AND METHOD FOR ASEPTIC PRESSURE RELIEF

CROSS-REFERENCE TO RELATED APPLICATIONS

This application is the National Stage of International Application No. PCT/EP2009/002099, filed on Mar. 21, 2009, which claims the benefit of German Application Serial No. 10 2008 018 665.1, filed on Apr. 11, 2008, the contents of both of the foregoing applications are hereby incorporated by reference in their entirety.

FIELD OF INVENTION

The invention relates to pipeline networks, and in particular, to pressure relief in pipeline networks.

BACKGROUND

In filling operations for sterile products, in particular when one aspires to a demanding license, such as an FDA license, conventional safety valves are often insufficient.

Conventional safety valves, as a rule, have a spring-loaded valve body that automatically opens at a certain limit pressure. These types of safety valves are known and have been described many times in patent literature, for example, EP 0 022 941 A1, EP 0 051 082 A1, DE 37 42 722 A1 and DE 196 07 840 C1, to name but a few.

In pipeline systems that are to be kept sterile, a surge creates the risk that the valve may open briefly to the non-sterile blow-off line. This can result in contamination. To reduce the risk of contamination when such conventional safety valves are used in filling processes for foodstuffs, in particular for beverages, the housing of the safety valve is continuously traversed by ambient pressure steam.

A disadvantage of the foregoing method is that a hot spot can develop in the pipeline network. Through heat conduction inside the metal pipeline, this hot spot leads to a temperature increase in more remote regions. But this temperature increase may not be enough to sterilize, but still enough to accelerate microbial growth. In addition, this solution wastes energy.

It is known to couple a rupture disc to a safety valve that is connected downstream. The rupture disc closes off in a more or less flush manner with the pipeline and is treated on one side by conventional cleaning and sterilizing routines. This solution makes it possible, in the event of the rupture disk breaking, to terminate the process in a controlled manner.

A disadvantage of the use of rupture discs is the costs involved when a rupture disc is lost and the subsequent time and money spent on labor and cleaning when a rupture disc has to be replaced. Consequently, it is an object of the invention to disclose a device that eliminates the abovementioned disadvantages.

SUMMARY

In one aspect, the invention features a pressure relief device for pipeline networks. The pressure relief device includes a supply line, which leads from the pipeline network to be made safe to the pressure relief device. It also has at least one safety valve and one discharge line. The most important feature is that at least two safety valves are provided. Each safety valve has an inlet side and an outlet side. The first safety valve is connected to a line of the pipeline network, and is also connected to the second safety valve via a connecting pipeline. The connecting pipeline has a supply line and a discharge line through which a liquid or gaseous flushing, cleaning, and/or sterilizing agent can be supplied or removed.

The first safety valve withstands a higher limit pressure than the second safety valve. This design makes it possible for the opening of the first safety valve not to result in non-sterility, but rather for the method not to have to be interrupted subsequent to a pressure blow or a pressure peak.

The interior of the connecting pipeline can routinely be acted upon after such an event by exposure to a suitable sterilizing agent, such as for example steam, active oxygen, H2O2 or peracetic acid. The limit pressure of a safety valve refers in this case to the level of pressure at which the safety valve opens.

In an advantageous manner, the load capacity of the safety valves is such that the limit pressure of the second safety valve is 50% less than the limit pressure of the first safety valve or even less. In this case, care must be taken to ensure that the pressure of the sterilizing medium that is conducted through the connecting pipeline is below the limit pressure of the second safety valve.

Flow management in the connecting pipeline can be problematic when liquid sterilizing media are used. An alternative embodiment addresses such problems by having the supply line of the sterilizing medium lead directly into an outlet side of the first safety valve and having the discharge line be connected directly to an inlet side of the second safety valve. This ensures a defined flow in the connecting pipeline.

It is possible to improve this variant even more by having an end of the supply line in the outlet side or in the connecting pipeline be oriented in such a manner that its outlet is directed onto the valve seat of the first safety valve. This ensures highly effective sterilization of the valve seat as rapidly as possible. For this reason, the end of the supply line should be a maximum of 20 mm away from the valve seat of the first safety valve.

In an alternative embodiment, a plurality of supply lines leads into the connecting pipeline.

In yet another embodiment, at least one outlet of the supply line is directed onto both the valve seat of the first safety valve and the valve seat of the second safety valve.

In another embodiment, a condensate separator is located in the discharge line and the connecting pipeline is located or shaped in such a manner that condensate can drain away freely.

The invention also comprises a method for pressure relief in pipeline networks, the method including the use of any of the foregoing embodiments.

BRIEF DESCRIPTION OF THE FIGURES

The invention is shown by way of two exemplary embodiments in FIGS. 1 and 2, in which.

DETAILED DESCRIPTION

Figure 1:
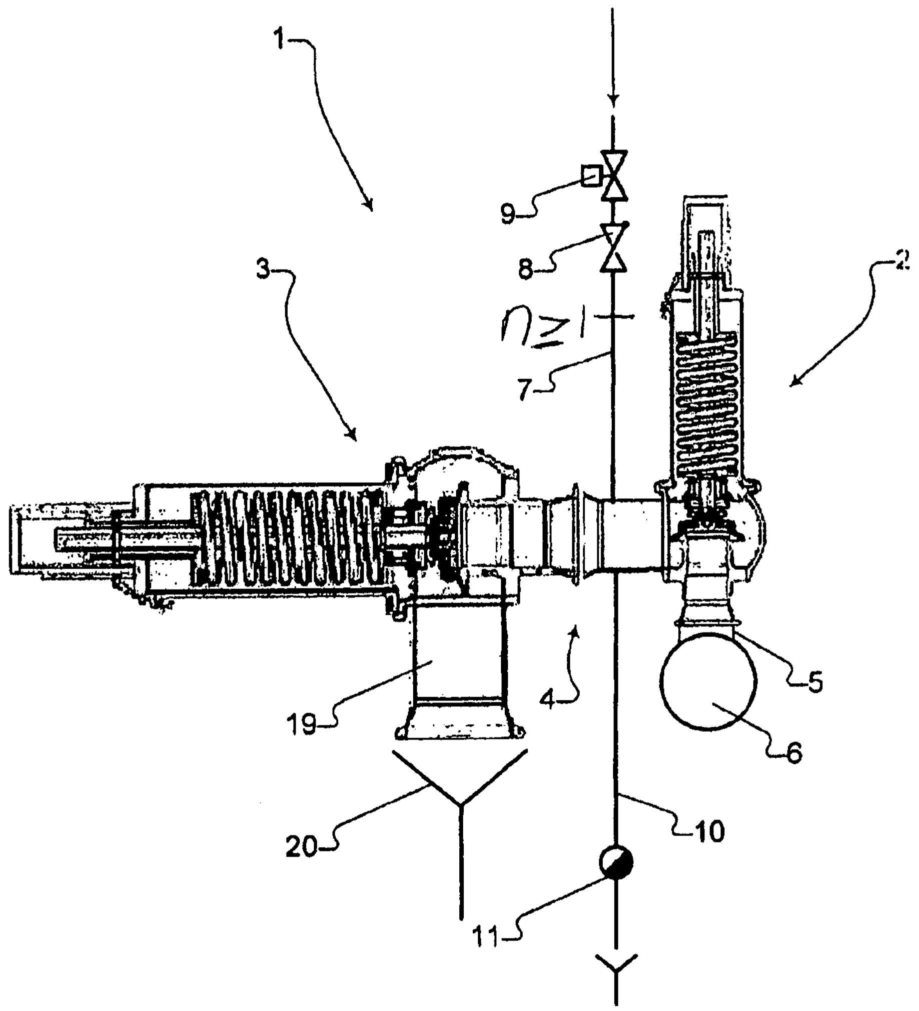
FIG. 1 shows a schematic representation of the basic arrangement.

FIG. 1 shows a schematic representation of a pressure relief device 1 comprising first and second safety valves 2, 3. The first safety valve 2 has a limit pressure of 5.5 bars; the second safety valve 3 has a limit pressure of 2.0 bars. A connecting pipeline 4 connects the first and second safety valves 2, 3. A pipe connection 5 connects the first safety valve 2 to a protected pipeline 6, which is part of the pipeline network to be monitored. A supply line 7 leads to the connecting pipeline 4. A controlled valve 8 and a non-return-valve 9 are located in the line path of the supply line 7. The arrow indicates the direction of flow of the sterilizing medium. A discharge line 10, which is connected to the condensate separator 11, leads away from the connecting pipeline 4.

The pressure relief device 1 shown in FIG. 1 is ideally acted upon with steam. The steam forms an active sterile block. If necessary, it is possible to sterilize the intermediate space in a continuous manner. The particular advantage is that even if with faulty bellows, no contamination can move into the pipeline system via the valve shaft. If, as a result of a pressure peak in the protected pipe 6, there are product leakages in the first safety valve 2, any leaked product drains away together with the condensate.

In the case of cleaning, the first and second safety valves 2, 3 are clocked together. In the case of sterilizing, the first and second safety valves 2, 3 do not need to be clocked because the hot water in the product pipeline together with the steam in the connecting pipeline 4 sufficiently heats and sterilizes the valve seat. An outflow 20 is provided below the outlet side 19 of the second safety valve 3.

Figure 2:
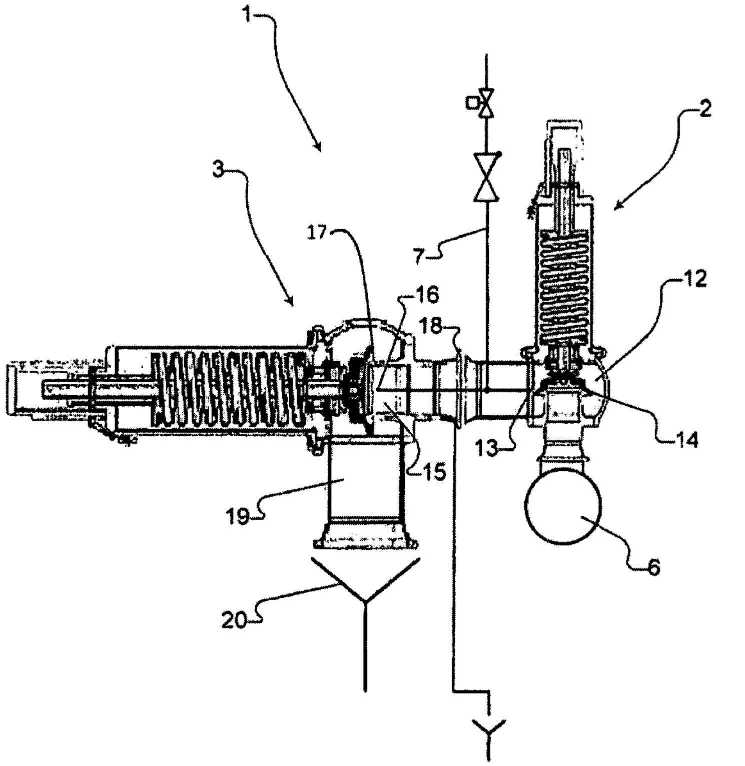
FIG. 2 shows a special arrangement of the outlets inside the connecting pipeline.

FIG. 2 shows a schematic representation of an alternative pressure relief device 1 that is suitable for the use of a liquid sterilizing medium. In this alternative embodiment, the supply line 7 branches off in the connecting pipeline into a left-hand and a right-hand branch. The right-hand branch leads into an outlet side 12 of the first safety valve 2; an outlet 13 of the right-hand branch of the supply line 7 is directed directly onto a valve seat 14.

The left-hand branch of the supply line 7 leads into an inlet side 15 of the second safety valve 3. An outlet 16 of the left-hand branch of the supply line 7 directly faces a valve seat 17 and is directed onto that valve seat 17. A widening is provided in the region of the flange 18 so that residual liquid or condensate can collect there and drain away. The discharge line 10 is also located in this region. This arrangement ensures ideal flow management in the connecting pipeline 4.

Having described the invention, and a preferred embodiment thereof, what is claimed as new, and secured by Letters Patent is:

1. An apparatus for use in a pipeline network to protect a line to be connected from contamination, said apparatus comprising a pressure relief device, said pressure relief device comprising: a first safety valve, a second safety valve, a connecting pipeline, a supply line, a supply-line safety valve, and a discharge line, wherein said first safety valve comprises an inlet side and an outlet side, wherein said first safety valve is connected to said line to be protected from contamination by said inlet side and to said connecting pipeline by said outlet side, wherein said first safety valve is configured to open in response to a first excess pressure in said line to be protected from contamination, and wherein said second safety valve comprises an inlet side connected to said connecting pipeline and an outlet side for discharge of working fluid from said connecting pipeline into an outflow, wherein said second safety valve is configured to open and discharge said working fluid in response to a second excess pressure in said connecting pipeline, wherein said connecting pipeline has a length, wherein said connecting pipeline extends between said first safety valve and said second safety valve, wherein said connecting pipeline connects said inlet side of said second safety valve to said outlet side of said first safety valve, and wherein said connecting pipeline separates said inlet side and said outlet side by a space extending between said first and second valves, wherein said space extends between said first and second valves having at least said length, wherein said supply line carries said working fluid to said connecting pipeline, wherein said supply-line safety valve is disposed along said supply line, wherein said discharge line connects to said connecting pipeline for removing said working fluid carried to said connecting pipeline by said supply line, and wherein said working fluid comprises a liquid or gaseous flushing, cleaning and/or sterilizing agent that, in operation, forms an active sterile block in said space of said connecting pipeline between said first and second safety valves, whereby risk of contamination of said line to be protected when said first safety valve is open and said second safety valve is closed is reduced.

2. The apparatus of claim 1, wherein the first safety valve is configured to withstand a higher limit pressure than the second safety valve.

3. The apparatus of claim 2, wherein the first and second safety valves each have a limit pressure, and wherein the limit pressure of the second safety valve is 50% or less than the limit pressure of the first safety valve.

4. The apparatus of claim 1, wherein the supply line leads into the outlet side of the first safety valve and the discharge line leads into the inlet side of the second safety valve.

5. The apparatus of claim 1, wherein the end of the supply line in the outlet side or in the connecting pipeline is oriented in such a manner that its outlet is directed onto a valve seat of the first safety valve.

6. The apparatus of claim 5, wherein the end of the supply line is a maximum of 20 mm away from the valve seat of the first safety valve.

7. The apparatus of claim 1, further comprising a plurality of supply lines that lead into the connecting pipeline.

8. The apparatus of claim 1, wherein at least one outlet of the supply line is directed onto a valve seat of the first safety valve and a valve seat of the second safety valve.

9. The apparatus of claim 1, further comprising a condensate separator located in the discharge line, and wherein the connecting pipeline is located or shaped to drain condensate.

10. A method for protecting a line to be protected from contamination, said method comprising: providing a first safety valve, a second safety valve, a connecting pipeline, a supply line, a supply-line safety valve, and a discharge line, wherein said first safety valve comprises an inlet side and an outlet side, wherein said first safety valve is connected to said line to be protected from contamination by said inlet side and to said connecting pipeline by said outlet side, wherein said first safety valve is configured to open in response to a first excess pressure in said line to be protected from contamination, and wherein said second safety valve comprises an inlet side connected to said connecting pipeline and an outlet side for discharge of fluid from said connecting pipeline, wherein said second safety valve is configured to open and discharge said fluid in response to a second excess pressure in said connecting pipeline, wherein said connecting pipeline has a length, wherein said connecting pipeline extends between said first safety valve and said second safety valve, wherein said connecting pipeline connects said inlet side of said second safety valve to said outlet side of said first safety valve, and wherein said connecting pipeline separates said inlet side and said outlet side by a space extending between said first and second valves, said space extending between said first and second valves having at least said length, wherein said supply line carries a working fluid to said connecting pipeline, wherein said supply-line safety valve is disposed along said supply line, wherein said discharge line connects to said connecting pipeline for removing said working fluid carried to said connecting pipeline by said supply line, and wherein said working fluid comprises a liquid or gaseous flushing, cleaning and/or sterilizing agent that, in operation, forms an active sterile block in said space of said connecting pipeline between said first and second safety valves, and causing said second safety valve to discharge working fluid from said connecting pipeline while said first safety valve is closed, thereby protecting said line to be protected from contamination.

11. The method of claim 10, further comprising selecting said working fluid to be active oxygen.

12. The method of claim 10, further comprising selecting said working fluid to comprise peracetic acid.

13. The method of claim 10, further comprising selecting said working fluid to be steam.

14. The method of claim 10, further comprising selecting said working fluid to be $H_2O_2$.

* * * * *